(12) United States Patent
Thia

(10) Patent No.: US 10,127,183 B2
(45) Date of Patent: Nov. 13, 2018

(54) SYSTEMS AND METHODS FOR PROVISIONING DEVICES OPERATING IN INDUSTRIAL AUTOMATION ENVIRONMENTS

(71) Applicant: FISHER CONTROLS INTERNATIONAL LLC, Marshalltown, IA (US)

(72) Inventor: Hock Heng Thia, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 147 days.

(21) Appl. No.: 15/199,229

(22) Filed: Jun. 30, 2016

(65) Prior Publication Data

US 2018/0004700 A1    Jan. 4, 2018

(51) Int. Cl.
*G06F 13/42* (2006.01)
*G05B 19/042* (2006.01)
*G05B 19/418* (2006.01)
*G06F 13/10* (2006.01)

(52) U.S. Cl.
CPC ..... *G06F 13/4282* (2013.01); *G05B 19/0423* (2013.01); *G05B 19/4186* (2013.01); *G06F 13/102* (2013.01); *G05B 2219/31229* (2013.01)

(58) Field of Classification Search
CPC ...... G06F 3/067; G06F 3/0689; G06F 3/0607; G06F 3/061; G06F 13/385
USPC .......................................................... 710/74
See application file for complete search history.

(56) References Cited

U.S. PATENT DOCUMENTS

| 7,089,530 B1 * | 8/2006 | Dardinski | G05B 15/02 700/83 |
| 8,112,565 B2 * | 2/2012 | Russell, III | G06F 13/387 710/62 |
| 9,203,665 B1 * | 12/2015 | Haran | H04B 3/04 |
| 9,397,855 B2 * | 7/2016 | Borgeson | H04L 12/40006 |

(Continued)

FOREIGN PATENT DOCUMENTS

WO    WO-2015/079725 A1    6/2015

OTHER PUBLICATIONS

Texas Instruments, "Replicator for MSP430 MCU," retrieved from http://www.ti.com/tool/ref430f, Jun. 30, 2016.

(Continued)

*Primary Examiner* — Brian T Misiura
(74) *Attorney, Agent, or Firm* — Marshall, Gerstein & Borun LLP

(57) ABSTRACT

A device is configured to operate in an industrial automation environment. The device includes a processing unit, a memory, an industrial communication interface to communicate with an external device via an industrial communication protocol, and a serial peripheral interface to communicate with a peripheral board during operation of the device. The device is configured to receive configuration data related to an industrial automation function of the device via the serial peripheral interface and store the received configuration data in the memory, when the serial peripheral interface is coupled to an external memory device. When the serial peripheral interface is coupled to the peripheral board, the device is configured to operate to perform the industrial automation function, in accordance with the received configuration data.

14 Claims, 4 Drawing Sheets

(56) References Cited

U.S. PATENT DOCUMENTS

| | | | |
|---|---|---|---|
| 9,443,186 B2* | 9/2016 | Lovell | G06K 19/07758 |
| 9,846,791 B2* | 12/2017 | Falk | G06F 21/606 |
| 2008/0181573 A1* | 7/2008 | Lampert | G06F 1/1626 |
| | | | 386/358 |
| 2008/0201582 A1 | 8/2008 | Jachmann et al. | |
| 2009/0319061 A1 | 12/2009 | Schwalbe et al. | |
| 2012/0123563 A1* | 5/2012 | Drinkard | F16P 3/144 |
| | | | 700/13 |
| 2016/0282830 A1 | 9/2016 | Fukai et al. | |
| 2016/0299478 A1* | 10/2016 | Junk | G05B 19/00 |
| 2017/0147367 A1* | 5/2017 | Alley | G06F 13/4221 |

OTHER PUBLICATIONS

Texas Instruments, "MSP430™ Programming with Bootloader (BSL)," User's Guide, SLAU319L, Jul. 2010, revised May 2016, retrieved from http://www.ti.com/lit/ug/slau319l/slau319l.pdf on Jun. 30, 2016.

Texas Instruments, "MSP430™ Programming with the JTAG Interface," User's Guide, SLAU320X, Jul. 2010, revised Jun. 2016, retrieved from http://www.ti.com/lit/ug/slau320x/slau320x.pdf on Jun. 30, 2016.

Wikipedia, "Serial Peripheral Interface Bus," Retrieved from the Internet Apr. 24, 2018 https://en.wikipedia.org/wiki/index/php?title=Serial_Peripheral_Interface_Bus&oldid=584991340.

International Search Report and Written Opinion for PCT/US2017/032649, dated Jul. 17, 2017.

\* cited by examiner

SYSTEMS AND METHODS FOR PROVISIONING DEVICES OPERATING IN INDUSTRIAL AUTOMATION ENVIRONMENTS

FIELD OF THE TECHNOLOGY

This disclosure relates generally to provisioning, or configuring, devices that perform industrial automation functions and communicate with external devices using industrial communication protocols, and more particularly to transferring configuration data to these devices via a general-purpose bus interface.

BACKGROUND INFORMATION

Industrial automation systems, which can include process control systems such as those used in the chemical industry and robotic systems used in factories, typically include special-purpose devices operating in a plant or field. Examples of such devices include valves, sensors, positioners, controllers, etc. Generally speaking, these devices perform respective industrial automation functions such as sensing a process parameter (e.g., temperature, pressure, flow rate, fluid level), calculating process parameters, controlling a process parameter (e.g., opening and closing valves, increasing or decreasing flow), generating alarms, etc.

Devices operating in industrial automation systems can be interconnected in a wired or wireless manner, and communicate using industrial communication protocols such as FOUNDATION™ Fieldbus, HART®, or Profibus. These protocols specify formats for conveying measurements, alerts and status reports, commands that affect process variables or automation parameters, commands for activating or deactivating devices, etc. A typical industrial communication protocol also supports device configuration, via pre-defined commands or commands defined by manufacturers for specific devices in accordance with the syntax of the protocol.

Provisioning devices via industrial communication protocols can take a significant amount of time due to the relatively low data rates supported by these protocols. For example, to download a 15 KB data package via a HART communication link at the rate of 1200 bps takes about 10 minutes. On the other hand, tools that allow replication of firmware via Joint Test Action Group (JTAG) or similar protocols impose a variety of restrictions such as compiling data into firmware, a physical control (e.g., a button) for activation, support of special interfaces and communication protocols, etc.

SUMMARY

In accordance with the provisioning techniques discussed below, a device configured to perform an industrial automation function and configured to communicate using an industrial communication protocol such FOUNDATION™ Fieldbus or HART® receives configuration data via a general-purpose bus such as serial peripheral interface (SPI) bus, at a rate significantly higher than the data rate supported by the industrial communication protocol. The configuration data is related to the industrial automation function of the device and can include, for example, a language pack made up of a set of messages in one or several languages to be displayed during operation of the device, sensor configuration data such as density tables, etc. The device can include a main electronic board coupled to a peripheral board such as a sensor board, and the configuration data ultimately may reside on the main electronic board or the peripheral board.

To initiate the transfer of configuration data according to one example scenario, the main electronic board is connected to an external memory via the general-purpose bus, and a command that conforms to the industrial communication protocol is sent to the main electronic board. The main electronic board in response to the command retrieves the configuration data via the general-purpose bus. The external memory then is disconnected from the main electronic board, and a peripheral board is coupled to the main electronic board via the general-purpose bus. The device then operates in accordance with the configuration data.

More particularly, one example embodiment of these techniques is a device configured to operate in an industrial automation environment. The device includes a processing unit, a memory, an industrial communication interface to communicate with an external device via an industrial communication protocol, and a serial peripheral interface to communicate with a peripheral board during operation of the device. When the serial peripheral interface is coupled to an external memory device, the device is configured to receive configuration data related to an industrial automation function of the device via the serial peripheral interface and store the received configuration data in the memory. When the serial peripheral interface is coupled to the peripheral board, the device is configured to operate to perform the industrial automation function, in accordance with the received configuration data.

Another example embodiment of these techniques is a method of provisioning devices configured to communicate using industrial communication protocols and equipped with general-purpose busses to interconnect device components. The method includes communicatively coupling a main electronic board of a device to an external memory via a general-purpose bus, transferring configuration data associated with an industrial automation function of the device from the external memory to the main electronic board via the general-purpose bus, and, subsequently to transferring the configuration data, disconnecting the external memory and communicatively coupling the main electronic board to a peripheral board. The device performs the industrial automation function in accordance with the received configuration data.

Yet another example embodiment of these techniques is a system for provisioning devices that operate in industrial automation environment. The system includes a main electronic board with a processing unit, a memory, an industrial communication interface to communicate with external devices via an industrial communication protocol, and a general-purpose bus. The system also includes an external memory device configured to communicate with the main electronic board when connected thereto via the general purpose bus and a peripheral board connectable to the main electronic board via the general-purpose bus and configured to perform a sensing or control function in the industrial automation environment. The system is configured to, when the main electronic board is coupled to the external memory via the general-purpose bus, transfer configuration data related to the sensing or control function from the external memory device to the main electronic board, where at least one of the main electronic board or the peripheral board utilizes the configuration data during operation.

DETAILED DESCRIPTION

Generally speaking, the methods and systems of this disclosure allow a device that performs an industrial automation function in a plant or field to quickly receive configuration data, during initial assembly and setup or as part of an update after the device has been deployed. As discussed below, the techniques of this disclosure include using an SPI bus or another suitable type of a general-purpose bus to temporarily couple the main electronic board of the device to an external memory and loading configuration data into the main electronic board at a data rate that significantly exceeds the data rate supported by an industrial communication protocol.

Figure 1:
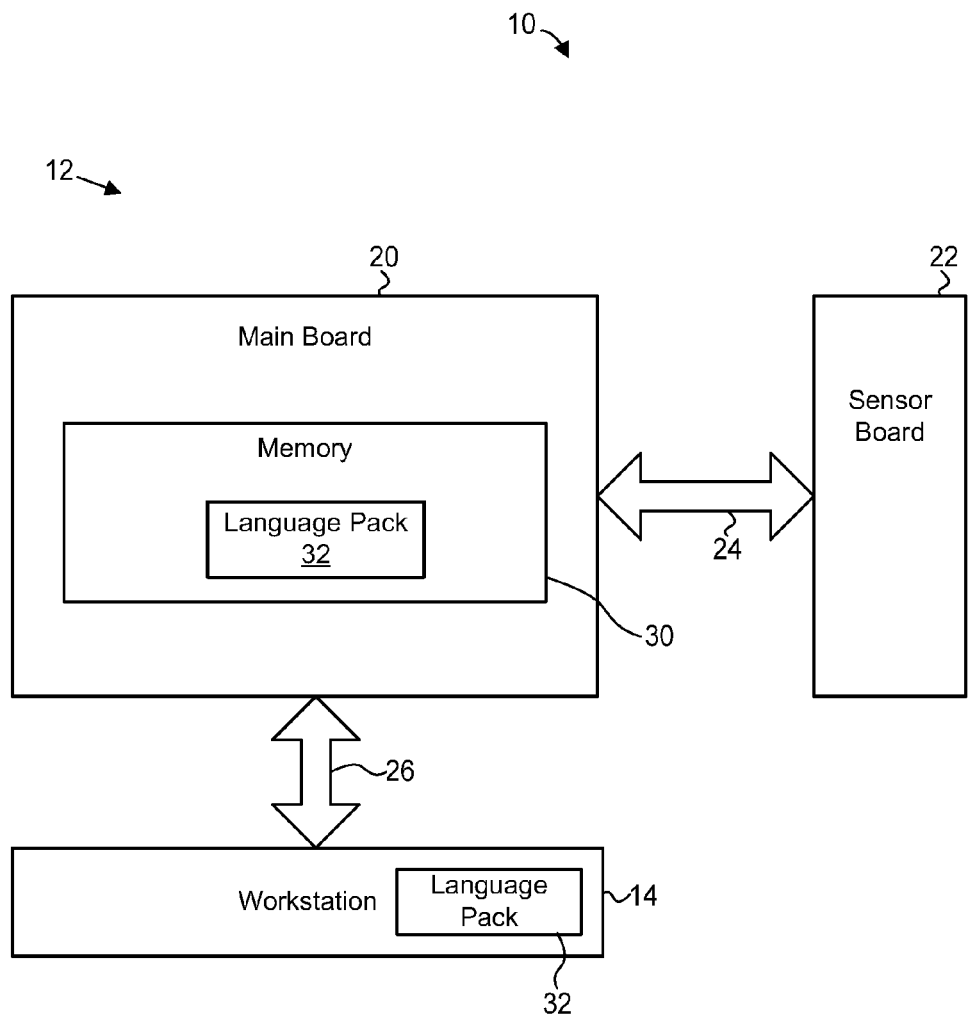
FIG. 1 is a block diagram of a known system for provisioning a device configured to communicate using an industrial communication protocol.

For clarity, a known approach for provisioning such devices is briefly discussed with reference to FIG. 1 and, more particularly, to downloading a language pack in the system illustrated in FIG. 1 using the HART communication protocol.

A system 10 includes a device 12 and a workstation 14 or another suitable device that supports HART communications. The device 12 includes a main electronic board 20 and a sensor board 22 which can include a pressure sensor, for example. The main electronic board 20 is equipped with memory 30 in which configuration data, include language packs, is stored. The boards 20 and 22 in this example are interconnected via an SPI bus 24.

To load a language pack 32 into the memory 30 from the memory of the workstation 14, an operator actuates a hardware or software control on the workstation 14. Using a HART modem (not shown to avoid visual clutter) and a software module that supports the HART protocol, the workstation 14 establishes a HART communication link 26 and transmits the language pack 32 to the device 12 via this link.

The HART communication link 26 supports only a relatively low data rate. More specifically, a language pack of 15 kB takes about 10 minutes to download via the HART interface 26 at 1200 bps. Generally speaking, the language pack includes a set of messages in one or several languages, which the device 12 can output for operators during operation. Because language packs in general can be expected to grow, the size of the language pack can reach 64 kB, in which case the download can take about 40 minutes. During manufacturing, when a large number of devices 12 is provisioned for deployment, this time expenditure can significantly increase the cost of production, delay releases, limit production capacity, etc. Moreover, when operators update devices in the field, the approach of FIG. 1 may require that the automation system or the process plant be taken offline for a long time.

Figure 2:
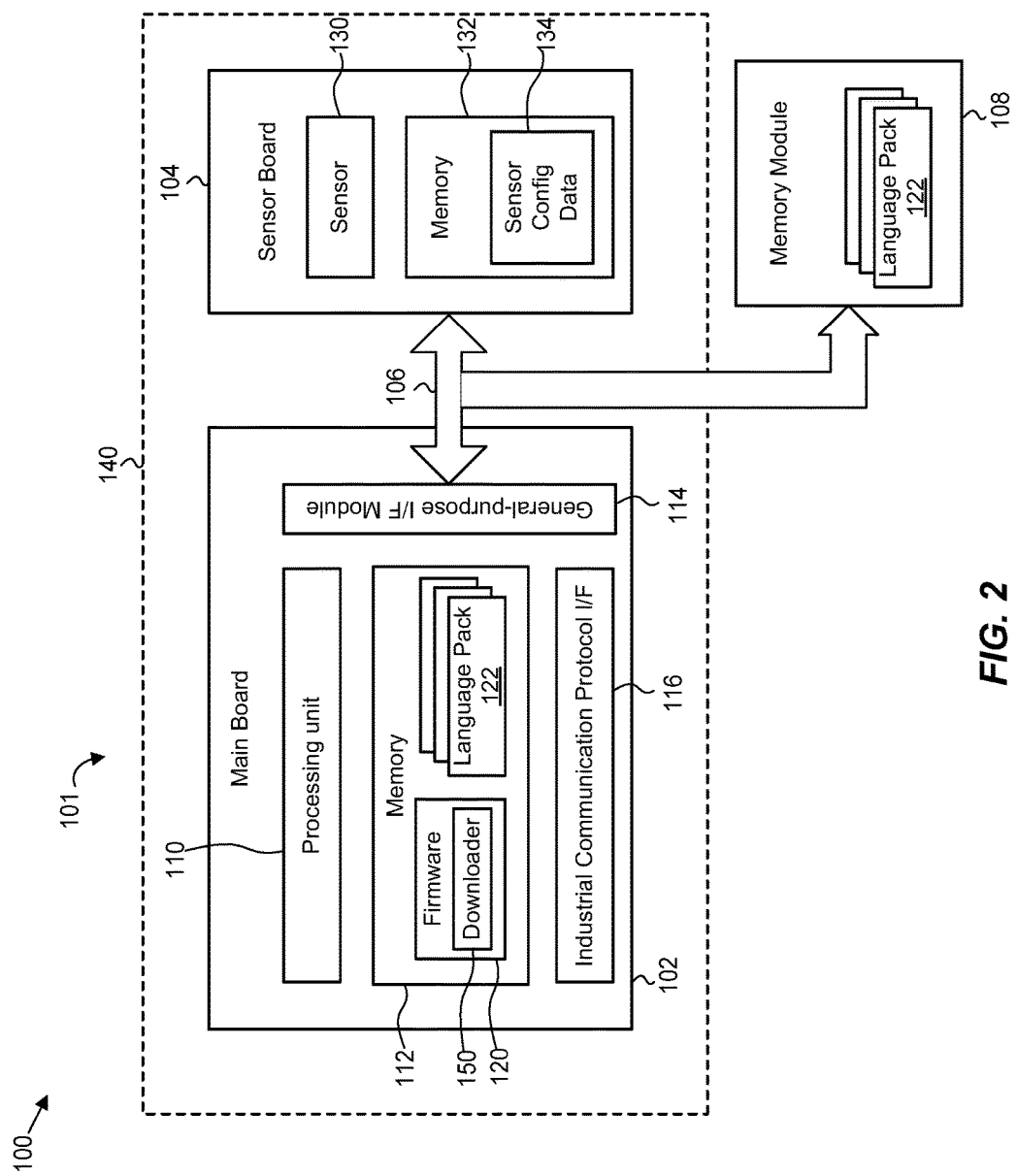
FIG. 2 is a block diagram of an example system for provisioning a main electronic board and/or a peripheral board of a device configured to communicate using an industrial communication protocol and equipped with a general-purpose bus, in accordance with the techniques of this disclosure.

In contrast, in a system 100 illustrated in FIG. 2, a language pack of 15 kB or 64 kB can be downloaded into a device in approximately 10 and 40 seconds, respectively. The components of this system are discussed next, followed by an overview of several example methods that can be implemented in, or used with, the system of FIG. 1.

The system 100 includes a device 101 in which a main electronic board 102 is configured to communicate with a sensor board 104 during normal operation. The device 101 implements an industrial automation function such as measuring a process variable and reporting the measurements to a remotely disposed controller via an industrial automation protocol. During initial provisioning or an update, however, the main electronic board 102 is connected to an external memory 108. The main electronic board 102 is connectable to both the sensor board 104 or other suitable peripheral board as well as to the external memory 108 via a general-purpose bus 106. The main electronic board 102 need not be able to connect to the sensor board 104 and the external memory 108 at the same time; in fact, to save cost, the general-purpose bus 106 in an example embodiment supports only one connection between the main electronic board 102 and another module. Similar to the device 10 discussed with reference to FIG. 1, the device 101 also supports communications in accordance with one or several industrial automation protocols.

The main electronic board 102 includes a processing unit 110, a memory 112, a general-purpose interface module 114, and an industrial communication interface module 116. The main electronic board 102 in other embodiments also can include additional modules, components, or interfaces.

The processing unit 110 can include one or several general-purpose processors such as CPUs. As one alternative, the processing unit 110 can include an application-specific integrated circuit (ASIC). As yet another alternative, the processing unit 110 can be implemented using a field-programmable gate array (FPGA) module. The processing functionality of the main electronic board 110 also can be distributed among several components, such as the processing unit 110 and the industrial communication interface module 116, for example. More generally, the processing unit 110 can include any suitable components to implement the functionality discussed below.

The memory 112 can be any suitable non-transitory memory readable by the processing unit 110, and can include persistent (e.g., a hard disk, flash memory, FRAM, EEPROM) and/or non-persistent (RAM, DRAM, etc.) components. The memory 112 can store instructions that make up firmware 120 of the device 101, a language pack 122 and other configuration data related to the operation of the main electronic board 102, additional configuration data related to the operation of the sensor board 104, process variable data such as sensor readings collected during the operation of the device 101, alerts and diagnostics data, etc. The firmware 120 includes a set of instructions executable by the processing unit 110. The instructions of the firmware 120 in general are not easily modifiable, but in some implementations a new version of the firmware 120 can be downloaded into the memory 112 (such firmware updates typically correspond to large transfers of data to the memory 112, and generally require that the device 101 be taken offline). Similar to the language pack of FIG. 1, the language 122 includes a set of strings in one or several languages, which the device 101 can output for operators during operation. These messages can include warnings, alerts, units of measurements to display such as information as "fluid temperature is 120 degrees Celsius" for example, requests for input, etc. It is noted that the language pack 122 is considered here by way of example only, and that the techniques for downloading configuration data which the system 100 implements can apply to other types of data such as sensor-specific tables and even firmware, if desired.

The general-purpose interface module 114 and the industrial communication interface module 116 can support communications according to respective protocols or sets of protocols, at their respective data rates. The general-purpose bus 106 can be an SPI bus, for example. In an example implementation, the general-purpose interface module 114 operates a 1.84 MHz clock, and accordingly the general-purpose bus 106 can support the data rate above 1 Mbps. The industrial communication interface module 116 can support FOUNDATION™ Fieldbus, HART®, Profibus, etc. In some implementations, the industrial communication interface module 116 can be provided outside the main electronic board 102 and coupled to the main electronic board 102 via a suitable bus. Further, in some implementations, the interface modules 114 and 116 can support both physical and logical layers of the corresponding protocols stack. In other implementations, the firmware 120 provides some of the protocol support. For example, the industrial communication interface module 116 can include the circuitry to modulate voltage over a 4-20 mA signal, in accordance with lower levels of the HART protocol stack, while the firmware 120 can support encoding and decoding of digital messages on the higher levels of the HART protocol stack. As another example, the industrial communication interface module 116 a radio circuitry to transmit and receive radio communication frames in accordance with the Wireless HART communication protocol, and while the firmware 120 can support higher levels of the Wireless HART communication protocol, similar to the example above.

With continued reference to FIG. 2, the sensor board 104 can include a sensor 130 to sense a process variable or automation parameter such as temperature, pressure, or flow rate. Although the sensor board 104 includes a single sensor module in this example, the sensor board 104 in general can include any suitable number of sensors of the same or different types. Even more generally, the sensor board 104 can be any suitable peripheral board with components that implement or assist the industrial automation function of the device 101. The memory 132 stores sensor configuration data 134. The sensor 130, or a processing unit disposed on the sensor board 104 separately from the sensor 130, can access the sensor configuration data 134 in operation.

In one example scenario, the device 101 is a digital level controller in which the sensor 130 measures liquid-specific gravity, also referred to as "density." The device 101 operates in a process control environment such an oil refinery. The sensor 130 in this example includes electronic as well as mechanical or electro-mechanical components such as a displacer on which process fluid exerts a buoyant force during operation, a torque tube shaft, an A/D converter, etc. The sensor configuration data 134 in this example can store a density table.

A housing 140 can enclose the main electronic board 102 alone both the main electronic board 102 and the sensor board 104, depending on the implementation. Accordingly, when the boards 102 and 104 are provided as an integral module within the housing 140, the general-purpose interface module 114 need not have an external port. In this implementation, an operator may need to partially or fully remove the housing 140 to couple the main electronic board 102 to the memory module 108. On the other hand, when the housing 140 encloses only the main electronic board 102, the general-purpose interface module 114 includes an external port to which the sensor board 104 or the external memory 108 can be coupled using a standard cable.

Still referring to FIG. 2, the device 101 also can include a user interface (UI) such as a screen. The user interface also can include hardware or software buttons for the operator to supply commands and other input. The input and output UI components are omitted from FIG. 2 to avoid clutter.

As further illustrated in FIG. 2, the memory stores a downloader module 150, which can be implemented as a set of instructions that make up the firmware 120, or as a separate software module, depending on the embodiment. The downloader module 150 can initiate the download of the language pack 122 from the external memory 108 using various suitable techniques. In one example implementation, the downloader module 150 automatically initiates the download of the language pack 122 upon detecting that the external memory 108 is coupled to the main electronic board 102 via the general-purpose bus 106. In another example implementation, the downloader module 150 initiates the download of the language pack 122 in response to a command received via the industrial communication interface 116 and conforming to the corresponding industrial communication protocol.

More particularly, the industrial communication protocol which the device 101 can specify a command for downloading configuration data such as the language pack 122. The industrial communication protocol alternatively may leave a range of commands for definition and use by specific manufacturers. These commands conform to the syntax of the industrial communication protocol (e.g., HART) and, as such, can be regarded as portions or extensions of the industrial communication protocol. In any case, the industrial communication protocol can define a procedure for initiating and conducting a download of configuration data such as the language pack 122 into the main electronic board 102, so that the device 101 may use this procedure to download the configuration data via the industrial communication protocol interface 116, if desired.

If desired, the downloader module 150 itself also can be downloaded using commands of the industrial communication protocol. In this manner, the manufacturer or operator can create downloader modules 150 for any desired purpose, e.g., downloading a particular code fix, new configuration data, sensor configuration data, etc.

In some implementations, the downloader module 150 additionally implements an authentication routine to ensure the device is not upgraded without proper authorization or otherwise tampered with while the device deployed in the field, for example. To this end, the downloader module 150 can require that login, passcode, or any other authentication information be supplied as part of the download initiation routine. The downloader module 150 can prevent the language pack 122 or other configuration data from being downloaded to the main electronic board 102 when the supplied authentication information fails verification. The downloader module 150 can implement any suitable verification mechanism, including those known in the art. Further, the downloader module 150 can implement a verification or error checking mechanism such as cyclic redundancy check (CRC), for example, to ensure that the data is delivered to the device 101 with no errors.

As indicated above, the downloader module 150 does not download the configuration data via the industrial communication protocol interface 116 and instead downloads the language pack 122 via the general-purpose interface module 114. The download module 150, however, in some cases downloads configuration data via the general-purpose interface module 114 in response to a command received via the industrial communication protocol interface 116. Although not illustrated in FIG. 2, a device from which such a command can be initiated via the industrial communication protocol interface 116 can include a workstation, a handheld device, or another suitable device that supports the corresponding industrial communication protocol.

In an example scenario, an operator wishes to quickly download a new language pack to a Wireless HART device deployed in the field, with the minimum interruption to the process in which the device operates. The language is stored on an external memory module equipped with an SPI port. The operator removes the housing, disconnects the sensor board from the main electronic board, and connects the external memory module to the main electronic board via the SPI port instead. The operator then uses a handheld HART communicator to send the appropriate command to the HART device via Wireless HART interface. In response, the device quickly retrieves the language pack from the external memory via the SPI bus. The operator then disconnects the external memory module, reconnects the sensor board to the main electronic board, and restores the housing. The operator then brings the device back online.

As a result, the device quickly and efficiently receives the new language pack. It is noted that this approach allows the language pack to be downloaded via a general-purpose bus separately from the firmware. In other words, the upgrade in this example scenario does not require that all of the firmware for the device 101 be replicated to upgrade only the language pack, which may constitute only a small part of the firmware image. Further, this approach eliminates the need to have specialized interfaces or hardware components and fixtures such as a hardware button to activate the download. Still further, this approach does not require specialized hardware or the support of specialized protocols such as JTAG, Spy-by-Wire (SBW), or bootstrap loader (BSL), for example.

The techniques described above reduce the time and, accordingly, the cost of manufacturing devices that operate in industrial automation environments. These techniques are applicable both at manufacturing/initial provisioning and during subsequent use of the device in the field, even if multiple downloads are desired. Thus, customization and upgrades, such as downloading larger language packs, incurs little time.

Figure 3:
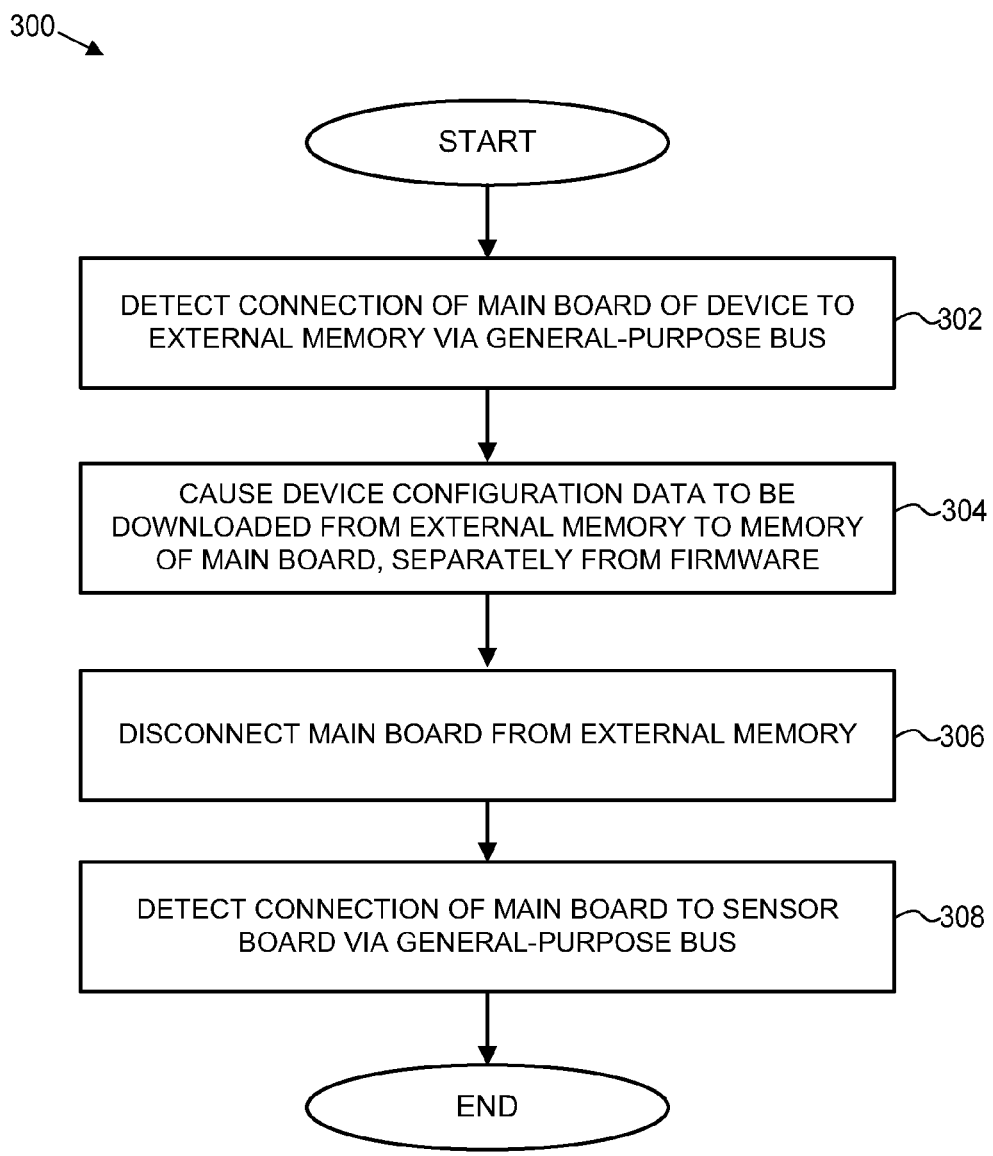
FIG. 3 is a flow diagram of an example method for provisioning a device configured to communicate using an industrial communication protocol, which can be implemented in the system of FIG. 2.

For further clarity, FIG. 3 illustrates a flow diagram of an example method 300 of provisioning a device configured to communicate using an industrial communication protocol. The method 300 can be implemented in the system of FIG. 1 or a similar environment.

The method 300 begins at block 302, where a connection of the main electronic board of a device to an external memory via a general-purpose bus is detected. As discussed above, the main electronic board can detect the connection automatically, or an appropriate command can be supplied to the main electronic board using an industrial communication protocol, for example.

Next, at block 304, configuration data can be downloaded into the main electronic board from the external memory via the general-purpose bus. The configuration data in accordance with these techniques advantageously is downloaded separately from the firmware, thereby reducing the amount of data to be transferred in some scenarios. For example, the configuration data can be a language pack or a density table for use by the sensor board.

At block 306, the main board is disconnected from the external memory and, at block 308, a connection of the main board to the sensor board via the general-purpose bus is detected. Similar to block 302, the disconnection and connection to the sensor board in some implementations are detected automatically. After the main board is connected to the sensor board, the corresponding device can be used in the corresponding industrial automation environment. If the method 300 is performed to upgrade the device, the device can be brought back online after executing block 308.

Moreover, in some cases the techniques discussed above can be used to efficiently provision several sensor boards that are then coupled to main boards. For example, referring back to FIG. 2, the system 100 can be used to efficiently provision peripheral boards such as the sensor boards 104 rather than provision a main board such as the main electronic board 102. The main board 102 in these example scenarios can be used as a "master" board via which multiple instances of the sensor board 104 are provisioned.

Figure 4:
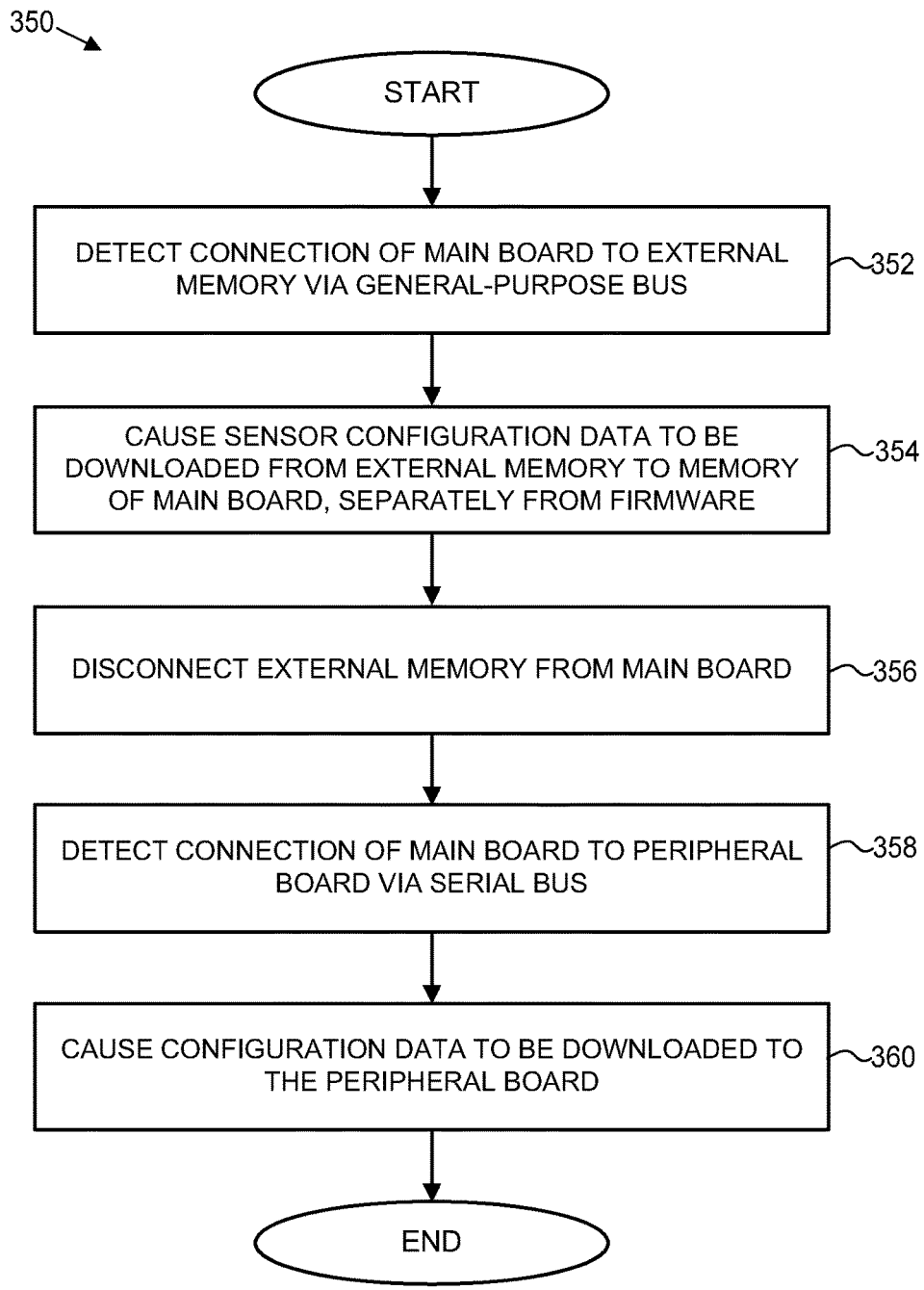
FIG. 4 is a flow diagram of an example method for provisioning a peripheral board configured to operate with a device that communicates using an industrial communication protocol, which can be implemented in the system of FIG. 2.

Referring to FIG. 4, an example method 350 for provisioning peripheral boards in this manner begins at block 352, where connection of the main electronic board of a device to an external memory via a general-purpose bus is detected. At block 354, configuration data can be downloaded into the main electronic board from the external memory via the general-purpose bus. The main board is disconnected from the external memory at block 356. These steps are generally similar to steps 302-306 discussed above with reference to FIG. 3.

At block 358, connection of the main electronic board to a peripheral board via a general-purpose bus is detected. In response, the configuration data is downloaded from the main electronic board to the peripheral board at block 360. In some implementations, a downloader module, such as the downloader module 150 of FIG. 2, can receive configuration data from the external memory via a general-purpose bus in response to a first command of the industrial communication protocol, and transmit configuration data to a peripheral board via the general-purpose bus in response to a second command of the industrial communication protocol. These commands can be received via the industrial communication protocol interface.

Blocks 358 and 360 can be executed multiple times to provision multiple peripheral boards, which then can operate in respective devices.

At least some of the steps of the methods 300 and 350 can be implemented using software and/or firmware instructions. More particularly, the method 300 can be implemented in the downloader module 150.

ADDITIONAL REMARKS

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the techniques of this disclosure have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A device configured to operate in an industrial automation environment, the device comprising:
    a processing unit disposed on a main electronic board;
    a memory disposed on the main electronic board;
    an industrial communication interface disposed on the main electronic board to communicate with an external device via an industrial communication protocol, wherein the industrial communication protocol specifies a dedicated command for transferring configuration data; and
    a serial peripheral interface to communicate with a peripheral board during operation of the device;
    wherein the device is configured to:
        when the serial peripheral interface is coupled to an external memory device, receive configuration data related to an industrial automation function of the device via the serial peripheral interface in response to the dedicated command provided to the main electronic board and store the received configuration data in the memory, and
        when the serial peripheral interface is coupled to the peripheral board, operate to perform the industrial automation function, in accordance with the received configuration data.

2. The device of claim 1 configured to receive the configuration data separately from firmware of the device.

3. The device of claim 1, wherein the main electronic board is coupled to the external memory device or the peripheral board via a set of wires defining a serial peripheral bus.

4. The device of claim 1, further comprising a user interface, wherein the configuration data includes a language pack made up of a plurality of messages in one or several languages, and wherein the device is configured to display messages selected from the plurality of messages in the language pack during operation of the device.

5. The device of claim 1 configured to apply at least one of (i) an authentication function or (ii) an error detection function to the received configuration data.

6. A method of provisioning devices configured to communicate using industrial communication protocols and equipped with general-purpose busses to interconnect device components, the method comprising:
    communicatively coupling a main electronic board of a device to an external memory via a general-purpose bus;
    receiving, at the main electronic board, a dedicated command specified by an industrial communication protocol;
    transferring configuration data associated with an industrial automation function of the device via the general-purpose bus in response to the dedicated command;
    subsequently to transferring the configuration data, disconnecting the external memory and communicatively coupling the main electronic board to a peripheral board;
    wherein the device performs the industrial automation function in accordance with the received configuration data.

7. The method of claim 6, further comprising:
    transferring firmware for operating the device to the main electronic board independently of the configuration data.

8. The method of claim 6, wherein transferring the configuration data via the general-purpose bus includes transferring the configuration data via a serial peripheral interface (SPI).

9. The method of claim 6, wherein transferring the configuration data includes transferring language pack with a set of messages in one or several languages, wherein the device displays at least some of the messages via a user interface during operation.

10. The method of claim 6, wherein transferring the configuration via the general-purpose bus includes:
    supplying verification data to the device, and
    preventing transfer of the configuration data when the supplied verification data fails verification at the device.

11. A system for provisioning devices that operate in industrial automation environment, the system comprising:
    a main electronic board including:
        a processing unit,
        a memory,
        an industrial communication interface to communicate with external devices via an industrial communication protocol, wherein the industrial communication protocol specifies a dedicated command for transferring configuration data, and
        a general-purpose bus; the system further comprising:
    an external memory device configured to communicate with the main electronic board when connected thereto via the general-purpose bus; and
    a peripheral board connectable to the main electronic board via the general-purpose bus and configured to perform a sensing or control function in the industrial automation environment;
    wherein the system is configured to:
        when the main electronic board is coupled to the external memory via the general-purpose bus, transfer configuration data related to the sensing or control function from the external memory device to the main electronic board in response to the dedicated command, wherein at least one of the main electronic board or the peripheral board utilizes the configuration data during operation.

12. The system of claim 11, wherein the system is configured to:
    subsequently to the main electronic board being disconnected from the external memory and connected to the peripheral board, cause the main electronic board to transfer the configuration data to the peripheral board via the general-purpose bus.

13. The system of claim 12 configured to provide the command to the main electronic board via the industrial communication interface.

14. The system of claim 11, further configured to transfer the configuration data to the main electronic board separately from firmware for the main electronic board.

* * * * *